W. J. FABER.
SHOCK ABSORBER FOR VEHICLES.
APPLICATION FILED OCT. 7, 1913.
1,117,014.
Patented Nov. 10, 1914.
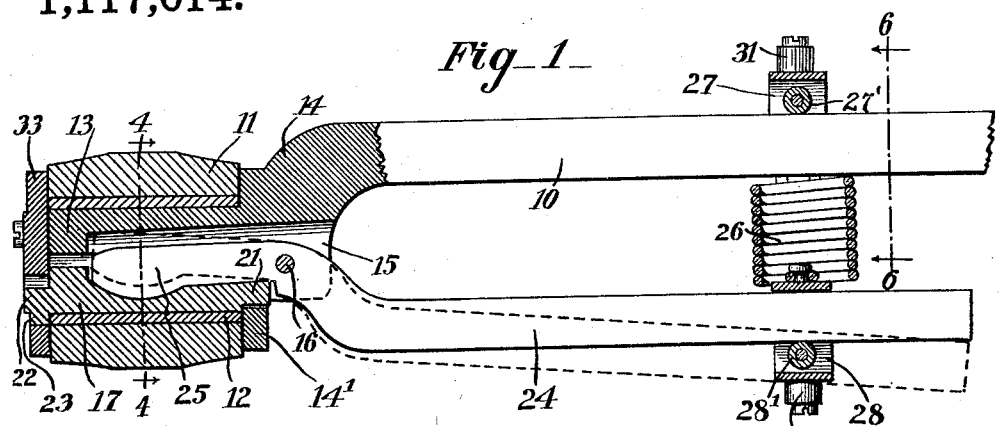
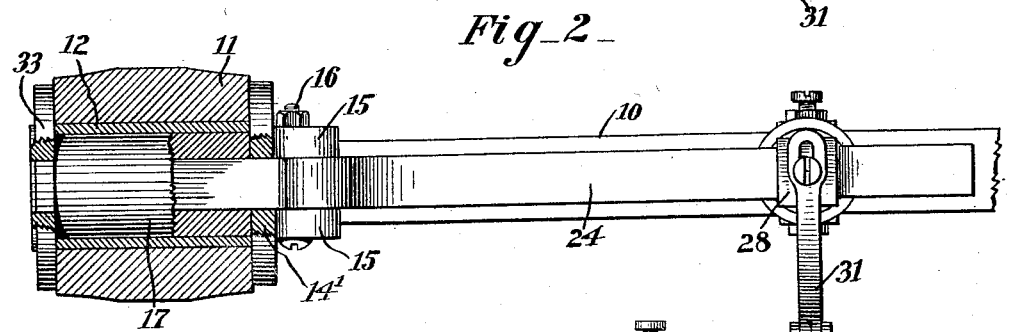
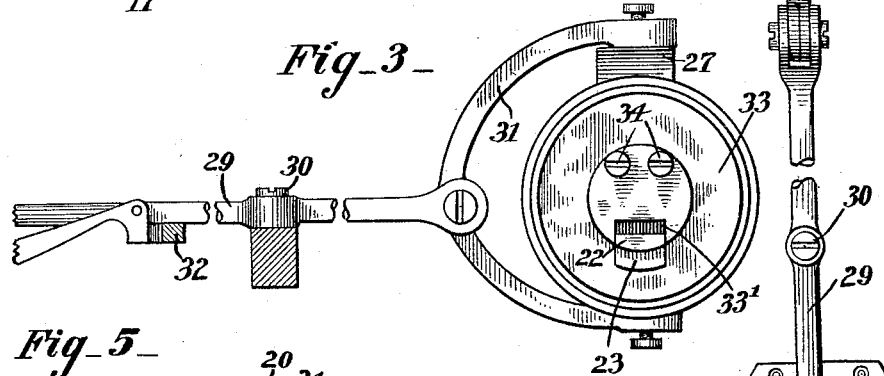
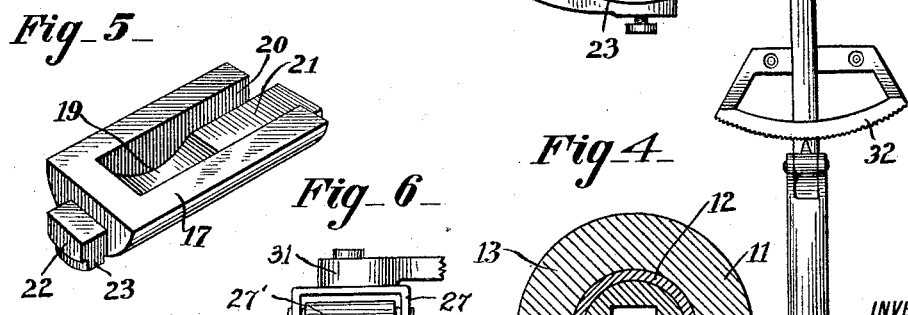
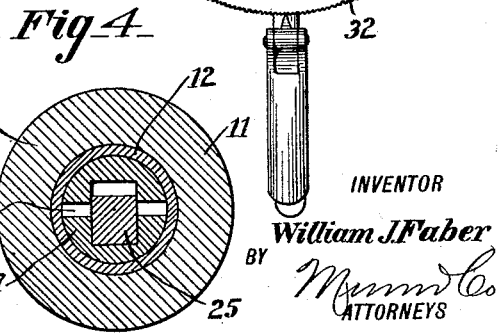
WITNESSES
Frank C. Palmer
Geo. L. Beeler
INVENTOR
William J. Faber
BY
Munn & Co.
ATTORNEYS

UNITED STATES PATENT OFFICE.

WILLIAM J. FABER, OF ONEIDA, NEW YORK, ASSIGNOR OF ONE-HALF TO CHRISTIAN C. FABER, OF BROOKLYN, NEW YORK.

SHOCK-ABSORBER FOR VEHICLES.

1,117,014.  Specification of Letters Patent.  Patented Nov. 10, 1914.

Application filed October 7, 1913. Serial No. 793,848.

*To all whom it may concern:*

Be it known that I, WILLIAM J. FABER, a citizen of the United States, and a resident of Oneida, in the county of Madison and State of New York, have invented a new and Improved Shock-Absorber for Vehicles, of which the following is a full, clear, and exact description.

This invention relates to vehicles and has particular reference to cushioning devices designed for the purpose of relieving shocks or jolts.

More particularly stated, the invention relates to motor vehicles or the like having peculiarly formed spindles or axles whereby the impact upon the wheel is to a large extent absorbed by a spring controlled member between the wheel and the main axle in a peculiar manner.

Another object of the invention is to provide a means for easily adjusting the means for controlling the shock whereby it may be variously set in accordance with varying weights or loads to be carried by the vehicle.

The foregoing and other objects of the invention will hereinafter be more fully described and claimed and illustrated in the drawings forming a part of this specification in which like characters of reference indicate corresponding parts in all the views, and in which—

Figure 1 is a vertical longitudinal section of the wheel hub and a portion of the spindle provided with my improvement; Fig. 2 is a bottom plan view of the spindle mechanism, the hub being in section; Fig. 3 is an end view as will be seen from the left of Fig. 1; Fig. 4 is a transverse section on the line 4—4 of Fig. 1; Fig. 5 is a perspective view of the spindle block; and Fig. 6 is a transverse sectional detail on the line 6—6 of Fig. 1.

The several parts of the device may be made of any suitable materials, and the relative sizes and proportions, as well as the general design of the mechanism, may be varied to a considerable extent without departing from the spirit of the invention hereinafter more fully set forth and specifically claimed.

At 10 I indicate one end of a main axle of any suitable type and adapted to support a vehicle frame or body in any approved manner. Only one end of the axle is shown but it will be understood that the other end thereof will be of the same character. At 11 I show the hub of a wheel applied to said axle. The hub is fitted interiorly with a cylindrical axle box 12.

The axle is formed into a spindle 13 of substantially semi-cylindrical form and coöperates with the upper half of the axle box 12, as shown in Figs. 1 and 4. A shoulder 14 at the inner end of the spindle limits the inward movement of the hub. A pair of lugs 15 extend downwardly from the shouldered portion 14 of the axle in spaced parallel relation to each other and they are provided with a transverse hole for a pivot bolt 16. Said shoulder, however, is continued in the form of an annular collar entirely around and spanning the space between the lugs as shown at 14'.

The above mentioned spindle block 17, shown in detail in Fig. 5, is of peculiar construction and approximately is of semi-cylindrical form and is fitted into the lower half of the hub opposite the spindle 13. The length of the block, at least the main portion thereof, is substantially equal to the length of the spindle axle box. It will be understood, however, that both the spindle 13 and the block will preferably be slightly less than a half cylinder, whereby a space 18 between them is provided when the parts both engage the inner surface of the axle box. The block, however, is recessed at its center forming a pocket 19 and having a throat 20 leading to the inner end of the block, the throat being shallower than the pocket 19. The end 21 of the block adjacent the throat constitutes a lug extending beyond the axle box and into the space between the lugs 15 of the axle and within the annular portion 14' of the shoulder, as shown in Fig. 1. The other end of the block is formed into a lug 22 extending beyond the axle box and having a lip 23 overlapping the end of the axle box.

At 24 I show a preferred form of auxiliary axle or lever, it being a lever of the first class, and pivoted on the pivot bolt 16. The outer end of the lever 24 extends into the space between the lugs 15 through the throat 20 and is provided with a head 25 adapted to be seated normally in the pocket 19 of the block. The inner end of the lever 24 is connected to the main axle by means of a contractile spring 26 of a strong or substantial nature. The ends of the spring are shown connected to a pair of yokes 27 and 28 having antifriction rollers 27' and 28' respectively, rolling upon the axle and the lower surface of the lever. The purpose of the spring 26 is to draw the inner end of the lever 24 upwardly toward the axle 16, whereby the block 17 will be held downwardly spaced from the spindle 13, the downward movement, however, being limited by the lug 21 and the shoulder extension 14' whereby tendency of the spring to cause undue friction between the block and the axle box will be prevented.

By providing the spring yokes with anti-friction rollers bearing upon the axle and lever, it is easy for the spring to be shifted longitudinally of the axle or toward and from the hub for the purpose of varying its effect. In order to control the position of the spring any suitable mechanism may be operated by the driver or chauffeur. For this purpose I indicate a hand lever 29 pivoted at 30 to some fixed part of the frame and having a fork 31 connected to the yokes 27 and 28. A toothed arc 32 may be provided to hold the lever in adjusted position.

A cap 33 of any suitable design is fitted to the outer end of the spindle and there secured by lag screws 34 or other means and provides a means for securing a wheel upon the spindle and providing a means for finishing or making the hub substantially dustproof. Said cap is provided with an opening 33' into which the lug 22 extends.

From the foregoing description of the construction the operation may be briefly described as follows: With the parts adjusted and arranged as shown in Fig. 1 and with the spring of sufficient strength to sustain the normal weight of the vehicle and its load, the shock or blow incident to the wheel striking an obstruction will cause the wheel to lift the block 17 and head 25 of the lever, causing the inner end of the lever to be thrown downwardly against the tension of the spring 26. The spring, therefore, will sustain the major portion of the shock, relieving the vehicle therefrom. By adjusting the spring farther from the hub it will be made more effective as to heavier loads. If the load be light, the operator, however, will adjust the spring toward the hub, making it more responsive to any bumps or irregularities in the road.

Having thus described my invention, I claim as new and desire to secure by Letters Patent:—

1. In a shock absorber for vehicles, the combination of an axle having a semi-cylindrical spindle, a spindle block of a form approximating that of the spindle and lying below the same and normally spaced therefrom, a wheel hub surrounding said spindle and block, a lever having one end extending between the spindle and the block, and means coöperating with the lever tending to force the block away from the spindle.

2. In a device of the character set forth, the combination of an axle, a spindle at the end of the axle, a block arranged opposite the spindle, a wheel hub surrounding the spindle and the block and journaled thereon, a member extending between the block and the spindle, and means acting between the axle and the member tending to cause the member to hold the block spaced from the spindle.

3. In a device of the character set forth, the combination of an axle, a spindle at the end of the axle, said axle having a pair of spaced lugs, a block below the spindle and normally spaced therefrom, a lever pivoted between said lugs and having one end extending between said spindle and block, means coöperating with the other end of the lever tending to cause the first mentioned end to force the block away from the spindle, and a wheel hub journaled upon the spindle and the block.

4. In a device of the character set forth, the combination of an axle, a spindle at one end of the axle, said axle being formed at one end of the spindle with an annular shoulder and a pair of spaced lugs, a block opposite the spindle, the block being of substantially the same length as the spindle but having a lug extending into the space between said lugs and coöperating with said shoulder, a lever pivoted between said lugs and having one end extending between the spindle and the block, a wheel hub surrounding the spindle and block, and means coöperating between the axle and lever tending to cause the block to be forced away from the spindle, such action, however, being limited by the block lug aforesaid.

5. In a device of the character set forth, the combination of an axle, a spindle at one end of the axle, a spindle block opposite the spindle and normally spaced therefrom, a wheel hub surrounding and journaled upon said spindle and spindle block, a member extending between the spindle and the block at one end, means coöperating with the other end of the member and the axle tending to cause the first mentioned end of the member to force the block away from the spindle, and means to vary the effective position of the last mentioned means.

In testimony whereof I have signed my name to this specification in the presence of two subscribing witnesses.

WILLIAM J. FABER.

Witnesses:
EDWARD B. FRENCH,
FRANK H. MUNZ.